(12) United States Patent
Yi et al.

(10) Patent No.: US 8,984,299 B1
(45) Date of Patent: Mar. 17, 2015

(54) APPARATUS FOR CODE OBFUSCATION AND METHOD THEREOF

(71) Applicant: Soongsil University Research Consortium Techno-Park, Seoul (KR)

(72) Inventors: Jeong Hyun Yi, Gyeonggi-do (KR); Jin Hyuk Jung, Seoul (KR)

(73) Assignee: Soongsil University Research Consortium Techno-Park, Seoul (KR)

( * ) Notice: Subject to any disclaimer, the term of this patent is extended or adjusted under 35 U.S.C. 154(b) by 0 days.

(21) Appl. No.: 14/360,306

(22) PCT Filed: Sep. 30, 2013

(86) PCT No.: PCT/KR2013/008744
§ 371 (c)(1),
(2) Date: May 23, 2014

(30) Foreign Application Priority Data

Aug. 14, 2013 (KR) .................. 10-2013-0096514

(51) Int. Cl.
*G06F 21/14* (2013.01)
(52) U.S. Cl.
CPC ........ *G06F 21/14* (2013.01); *G06F 2221/0748* (2013.01)
USPC .......................................... 713/189
(58) Field of Classification Search
CPC ..................................... G06F 21/14
USPC .......................................... 713/189
See application file for complete search history.

(56) References Cited

U.S. PATENT DOCUMENTS

| | | | |
|---|---|---|---|
| 6,643,775 B1 * | 11/2003 | Granger et al. | 713/190 |
| 8,200,983 B1 * | 6/2012 | Victorov | 713/187 |
| 8,892,876 B1 * | 11/2014 | Huang et al. | 713/165 |
| 2004/0103404 A1 * | 5/2004 | Naumovich et al. | 717/136 |
| 2013/0227688 A1 * | 8/2013 | Kim et al. | 726/23 |
| 2014/0380283 A1 * | 12/2014 | Hu et al. | 717/132 |
| 2015/0007325 A1 * | 1/2015 | Eliseev et al. | 726/24 |

FOREIGN PATENT DOCUMENTS

| | | | |
|---|---|---|---|
| JP | 2005-072584 A | 3/2005 |
| JP | 2006-164184 A | 6/2006 |

(Continued)

OTHER PUBLICATIONS

Li et al., "Android Malware Forensics: Reconstruction of Malicious Events", 2012, IEEE Computer Society, pp. 552-558.*
Grace et al., "RiskRanker: Scalable and Accurate Zero-day Android Malware Detection", Jun. 2012, ACM, pp. 281-293.*

(Continued)

*Primary Examiner* — Matthew Smithers
(74) *Attorney, Agent, or Firm* — Revolution IP, PLLC

(57) ABSTRACT

Disclosed is an apparatus for code obfuscation includes: an input unit that receives execution codes for android applications; a code analyzer that separates the input execution codes into sensitive codes that needs to be protected from application forgery attack and general codes except for the sensitive codes by analyzing the input execution codes; a dalvik to C code converter that creates native codes by converting the sensitive codes into a C code; an obfuscator that obfuscates the native codes and the general codes; a self code protector that encrypts the obfuscated native codes by adding a tamper-detection code to the obfuscated native codes and then creates self-modified native codes by adding a loading routine; and a code combiner that combines the self-modified native codes with the obfuscated general codes.

10 Claims, 3 Drawing Sheets

(56) References Cited

FOREIGN PATENT DOCUMENTS

| | | |
|---|---|---|
| KR | 10-1234591 | 2/2013 |
| KR | 10-1265099 | 5/2013 |

OTHER PUBLICATIONS

Grace et al., "Unsafe Exposure Analysis of Mobile In-App Advertisements", Apr. 2012, ACM, pp. 101-112.*

* cited by examiner

APPARATUS FOR CODE OBFUSCATION AND METHOD THEREOF

CROSS REFERENCE TO PRIOR APPLICATIONS

This application is a National Stage Application of PCT International Patent Application No. PCT/KR2013/008744 filed on Sep. 30, 2013, under 35 U.S.C. §371, which claims priority to Korean Patent Application No. 10-2013-0096514 filed on Aug. 14, 2013, which are all hereby incorporated by reference in their entirety.

TECHNICAL FIELD

The present invention relates to an apparatus for code obfuscation and a method thereof, and more particularly to an obfuscation apparatus based of self modification for preventing forgery of an android application, and an obfuscation method.

BACKGROUND ART

The obfuscation apparatuses and methods of the related art are used for applications that operate in a java virtual machine, and perform obfuscation by changing the code structure of the applications. The obfuscated applications are composed of a group of commands and an object file that operate in a java virtual machine in the same way before the obfuscation.

In the obfuscation apparatuses and methods of the related art, however, there is a problem in that the vulnerability to reverse engineering of the managed code that operates in a virtual machine remains even after obfuscation.

The vulnerability to reverse engineering of the managed code is as follows. Source code information such as the class name, the member variable name, and the method name is included in a complied object code and the code is explicitly structurized, such that it is easy to find or analyze a specific logic through reverse engineering.

Android applications, similar to the applications that operate in a java machine, are also composed of managed codes that operate in a dalvik virtual machine, and are stored in the format of DEX (dalvik executable) file. Accordingly, android applications also have vulnerability to reverse engineering of the managed code.

The background art of the present invention has been described in Korean Patent Registration Publication No. 10-1234591 (2013, 2, 19).

DISCLOSURE

Technical Problem

An object of the present invention is to make reverse engineering relatively difficult and prevent reverse engineering by removing structurized code information that is one of vulnerability to reverse engineering of a managed code, by reconfiguring the sensitive codes of an application to be obfuscated into a group of CPU commands and by converting the sensitive codes from managed codes into native codes.

Another object of the present invention is to improve resistance against reverse engineering analysis, using a code protection scheme based on self modification and a tamper-detection scheme in order to protect sensitive codes converted into native codes.

Technical Solution

An apparatus for code obfuscation according to an embodiment of the present invention includes: an input unit that receives execution codes for android applications; a code analyzer that separates the input execution codes into sensitive codes that needs to be protected from application forgery attack and general codes except for the sensitive codes by analyzing the input execution codes; a dalvik to C code converter that creates native codes by converting the sensitive codes into a C code; an obfuscator that obfuscates the native codes and the general codes; a self code protector that encrypts the obfuscated native codes by adding a tamper-detection code to the obfuscated native codes and then creates self-modified native codes by adding a loading routine; and a code combiner that combines the self-modified native codes with the obfuscated general codes.

The method may further include transmitting the self-modified native codes and the obfuscated general codes, which are combined by the code combiner, to a client.

The self-modified native codes may operate in a CPU environment and the obfuscated general codes may be executed in a dalvik virtual machine.

The code analyzer may determine the codes matched with the inputted execution codes as the sensitive codes, using stored important code models.

The loading routine may decode the encrypted section of the native code when the encrypted native code is executed.

A method of code obfuscation, using an apparatus for code obfuscation according to an embodiment of the present invention includes: receiving execution codes for android applications; separating the input execution codes into sensitive codes that needs to be protected from application forgery attack and general codes except for the sensitive codes by analyzing the input execution codes; creating native codes by converting the sensitive codes into a C code; obfuscating the native codes and the general codes; encrypting the obfuscated native codes by adding a tamper-detection code to the obfuscated native codes and then creates self-modified native codes by adding a loading routine; and combining the self-modified native codes with the obfuscated general codes.

Advantageous Effects

According to the apparatus for code obfuscation and the method of code obfuscation of the present invention, it is possible to make reverse engineering relatively difficult and prevent reverse engineering by removing structurized code information that is one of vulnerability to reverse engineering of a managed code, by reconfiguring the sensitive codes of an application to be obfuscated into a group of CPU commands and by converting the sensitive codes from managed codes into native codes.

Further, it is possible to improve resistance against reverse engineering analysis, using a code protection scheme based on self modification and a tamper-detection scheme in order to protect the sensitive codes converted into native codes.

DESCRIPTION OF MAIN REFERENCE NUMERALS OF DRAWINGS

Figure 1:
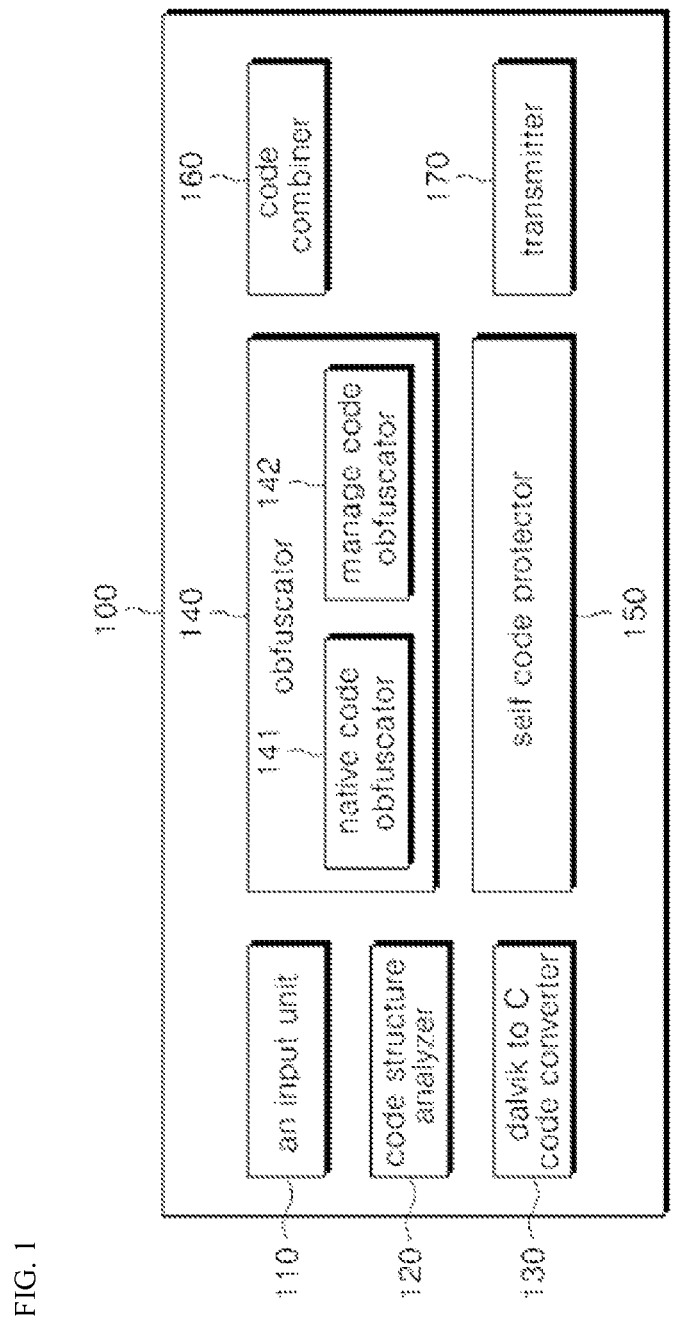
FIG. 1 is a diagram illustrating the configuration of an apparatus for code obfuscation according to an embodiment of the present invention.

100: apparatus for code obfuscation
110: input unit

120: code analyzer
130: dalvik to C code converter
140: obfuscator
141: managed code obfuscator
142: native code obfuscator
150: self code protector
160: code combiner
170: transmitter

BEST MODE

Embodiments of the present invention will be described in detail with reference to the accompanying drawings for those skilled in the art to easily achieve the present invention. However, the present invention may be achieved in various different ways and is not limited to the embodiments described herein. In the accompanying drawings, portions unrelated to the description will be omitted in order to obviously describe the present invention, and similar reference numerals will be used to describe similar portions throughout the present specification.

An apparatus for code obfuscation of the present invention is described first.

FIG. 1 is a diagram illustrating the configuration of an apparatus for code obfuscation according to an embodiment of the present invention.

Referring to FIG. 1, an apparatus 100 for code obfuscation includes an input unit 110, a code structure analyzer 120, a dalvik to C code converter 130, an obfuscator 140, a self code protector 150, and a code combiner 160, and may further include a transmitter 170.

The input unit 110 receives execution codes for android applications. The input unit may have an input interface, in a type of keypads.

The code structure analyzer 120 separates a sensitive code from the existing code in accordance with input by a user by analyzing a DEX file that is an execution file compressed in an APK (Android Package) file.

The dalvik to C code converter 130 converts a managed code into a native code by analyzing and reconfiguring a general code and the separated sensitive code into a C code.

The obfuscator 140 may include a native code obfuscator 141 and a managed code obfuscator 142. The native code obfuscator 142 performs an obfuscation scheme on the sensitive code converted into a native code under a native environment. Further, the managed code obfuscator 142 performs an obfuscation scheme on a general code under a managed environment.

The self code protector 150 adds a tamper-detection code to protect an obfuscated native code from static analysis, and encrypts codes, using a code protection scheme based of self modification. Further, the self code protector 150 creates a self-modified native code by adding a loading routine in the encrypted native code.

The code combiner 160 packages the encrypted general code and the self-modified native code into an APK file.

The transmitter 170 transmits the code packaged by the code combiner 160 (the self-modified native code and the encrypted general code) to a client. The transmitter 170 may directly transmit the packaged code to a client or may upload it on an android market so that a client can download it.

Figure 2:
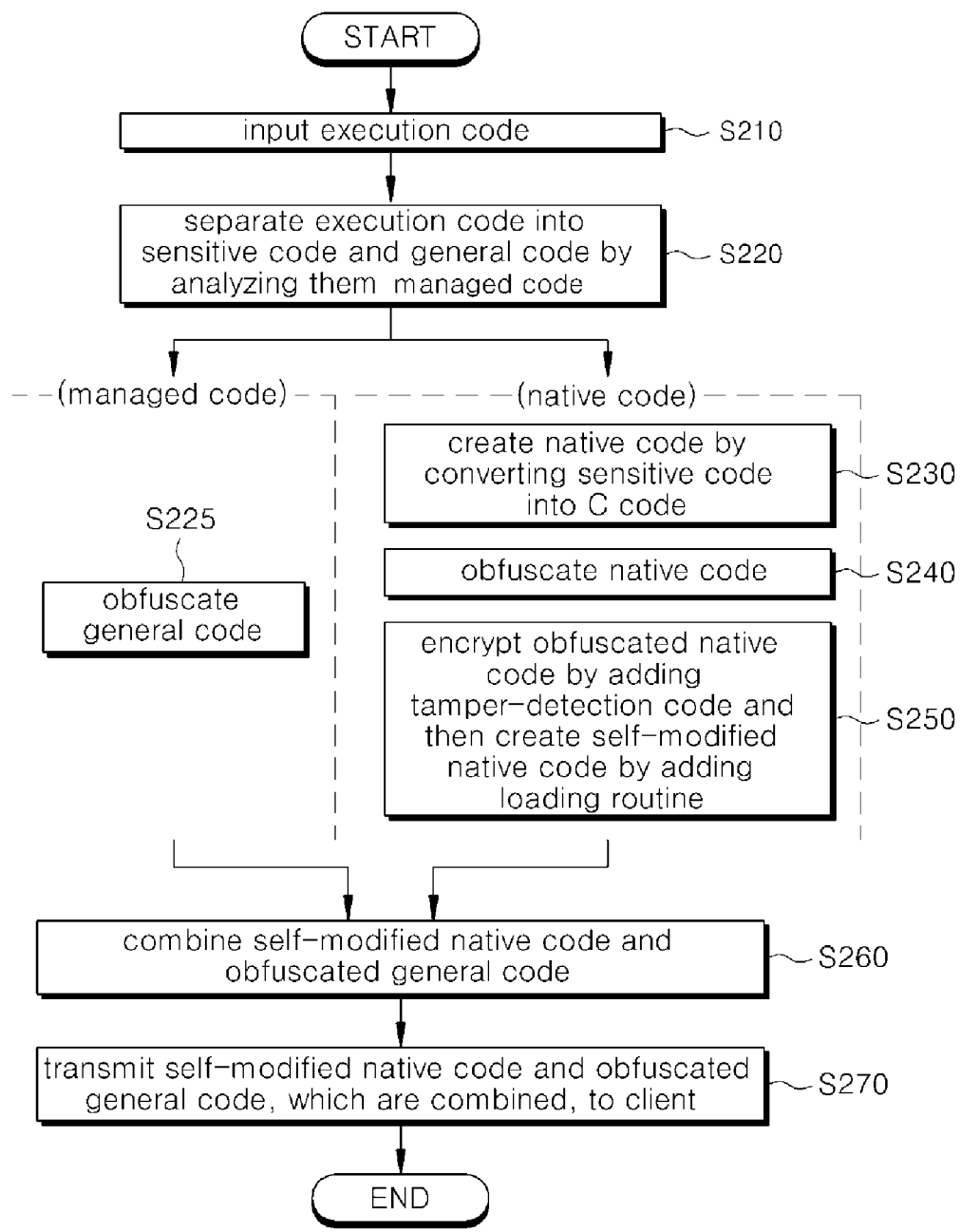
FIG. 2 is a flowchart illustrating a method of code obfuscation according to an embodiment of the present invention.
Figure 3:
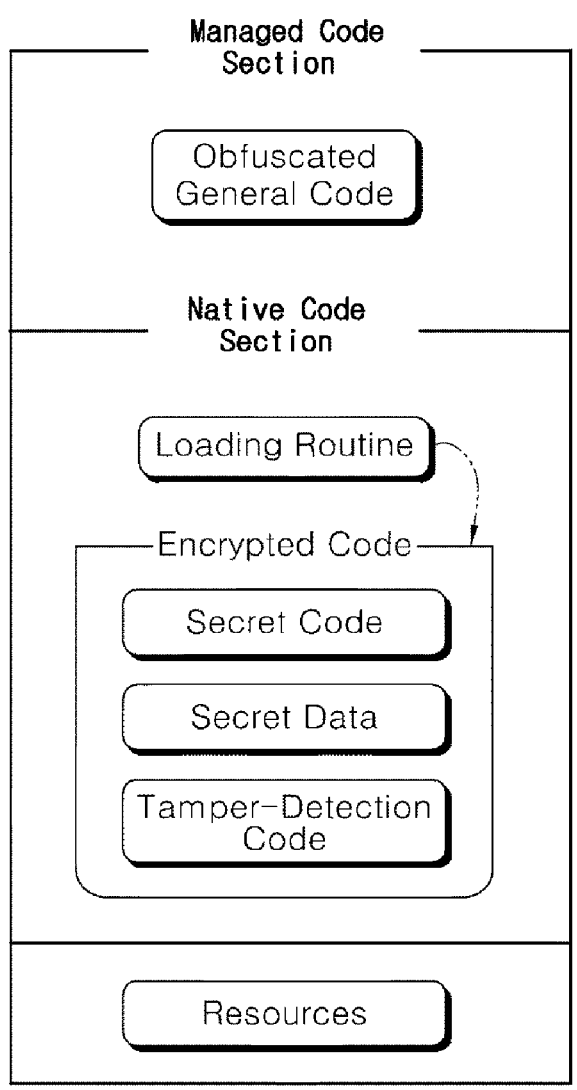
FIG. 3 is a diagram illustrating the configuration of an obfuscated and encrypted application file according to an embodiment of the present invention.

A code obfuscation method according to an embodiment of the present invention is described hereafter with reference to FIGS. 2 and 3.

FIG. 2 is a flowchart illustrating a method of code obfuscation according to an embodiment of the present invention and FIG. 3 is a diagram illustrating the configuration of an obfuscated and combined application file according to an embodiment of the present invention.

Referring to FIG. 2, the input unit 10 receives an execution code for an android application (S210). The process of inputting the execution code may include an action of designating an APK (Android Package) file that is an android application file by a user through an input interface, an action of uncompressing the designated APK file, and an action of designating a DEX file that is the execution file for the android application.

The android application is distributed with the extension in apk type. The apk means an android package and a compressed file with an extension of apk (hereafter, APK file) is created through a process of compiling or linking various files in the process of building an android application. The execution code means the code of an execution file with an extension of dex (hereafter, DEX file) compressed in an APK that is an android application file.

The code analyzer 120 classifies input execution codes into sensitive codes requiring application tamper-protection and general codes except for the sensitive codes by analyzing the inputted execution codes from the input unit 110 (S220).

For the code classification, the code analyzer 120 determines the codes matched with sensitive code models in the inputted execution codes as sensitive codes, using stored sensitive code models. The inputted execution codes are codes forming a DEX file. Further, the sensitive codes mean the codes requiring tamper-protection against a hacker in the side of the user. The codes except for the sensitive codes are called general codes, in opposite conception to the sensitive codes.

The dalvik to C code converter 130 converts a managed code into a native code by analyzing and reconfiguring a general code and the separated sensitive code into a C code (S230).

The converted native code is stored in an ELF (Executable and Linkable Format). The code structure of the ELF is not clearly discriminated, such that it has an advantage that it is not relatively easily exposed to dynamic analysis or static analysis for code forgery in comparison to the DEX format. Further, the ELF type is composed of CPU commands at a low level close to the mechanical language in comparison to Dalvik commands, such that a hacker has difficulty in dynamic analysis and static analysis.

The native code obfuscator 141 performs an obfuscation scheme that is available under a native environment on the sensitive code converted into a native code (S240).

The self code protector 150 adds a tamper-detection code to protect an obfuscated native code from static analysis, and encrypts codes, using a code protection scheme based of self modification. Further, the self code protector 150 creates a self-modified native code by adding a loading routine in the encrypted native code (S250).

Further, the tamper-detection code added to a native code can detect addition or forgery of a code by a hacker by dynamically detecting forgery of an application. When an action of forgery by a hacker is detected by the tamper-detection code, the tamper-detection code can stop analyzing code of the hacker by forcibly ending the application that is in execution. Further, the tamper-detection code reduces the possibility of a hacker going round the tamper-detection routine by being protected by a self modification scheme.

The loading routine added by the self code protector 150 decodes the encrypted section of a specific code when the specific code is executed. That is, in the encrypted specific code, only the routine that is called in execution is temporarily decoded. Accordingly, it is possible to prevent code forgery by a hacker by reducing the time range in which an encrypted code is exposed.

The managed code obfuscator 142 performs an obfuscation scheme that is available under a managed environment on the general code converted into a managed code (S255). That is, the obfuscator 140 can be divided in to the native code obfuscator 141 and the managed code obfuscator 142 in terms of hardware and separates and obfuscates sensitive codes or general codes under different environments of the native environment and the managed environment.

The code combiner 160 packages an APK file into a managed code section corresponding to an obfuscated general code as illustrated in FIG. 3 and a native code section corresponding to a self-modified sensitive code where a loading routine is added (S260).

The code section of the obfuscated android application file in FIG. 3 is divided into a managed code section and native code section. The managed code section includes an obfuscated general code created by the obfuscator 140 and the native code section includes an encrypted code and loading routine.

The encrypted code created by the self code protector 150 includes a secret code created by encrypting a native code, and secret data and a tamper-detection code that are transmitted with a native code.

The transmitter 170 transmits the self-modified native code packaged by the code combiner 160 and an obfuscated general code to a client (S270). The transmitted files are in the type that can be downloaded and installed in a client and they may be APK files including a native code and a general code.

As described above, according to the present invention, it is possible to make reverse engineering relatively difficult and prevent reverse engineering by removing structurized code information that is one of vulnerability to reverse engineering of a managed code, by reconfiguring the sensitive codes of an application to be obfuscated into a group of CPU commands and by converting the sensitive codes from managed codes into native codes.

It is possible to improve resistance against reverse engineering analysis, using a code protection scheme based on self modification and a tamper-detection scheme in order to protect sensitive codes converted into native codes.

The present invention was described on the basis of embodiment. Those skilled in the art may understand that various modifications may be made without departing from the scope of the present invention. Accordingly, it should be noted that the embodiments are provided not to limit, but to explain the present invention. Accordingly, the present invention should be construed as including various embodiments within the claims and the equivalent range without being limited to the embodiments described above.

The invention claimed is:

1. An apparatus for code obfuscation, comprising:
    an input unit that receives execution codes for android applications;
    a code analyzer that separates the input execution codes into sensitive codes that needs to be protected from application forgery attack and general codes except for the sensitive codes by analyzing the input execution codes;
    a dalvik to C code converter that creates native codes by converting the sensitive codes into a C code;
    an obfuscator that obfuscates the native codes and the general codes;
    a self code protector that encrypts the obfuscated native codes by adding a tamper-detection code to the obfuscated native codes and then creates self-modified native codes by adding a loading routine; and
    a code combiner that combines the self-modified native codes with the obfuscated general codes.

2. The apparatus of claim 1, further comprising a transmitter that transmits the self-modified native codes and the obfuscated general codes, which are combined by the code combiner, to a client.

3. The apparatus of claim 2, wherein the self-modified native codes operate in a CPU environment and the obfuscated general codes are executed in a dalvik virtual machine.

4. The apparatus of claim 3, wherein the code analyzer determines the codes matched with the inputted execution codes as the sensitive codes, using stored important code models.

5. The apparatus of claim 4, wherein the loading routine decodes the encrypted section of the native code when the encrypted native code is executed.

6. A method of code obfuscation, using an apparatus for code obfuscation, the method comprising:
    receiving execution codes for android applications;
    separating the inputted execution codes into sensitive codes that needs to be protected from application forgery attack and general codes except for the sensitive codes by analyzing the input execution codes;
    creating native codes by converting the sensitive codes into a C code;
    obfuscating the native codes and the general codes;
    encrypting the obfuscated native codes by adding a tamper-detection code to the obfuscated native codes and then creates self-modified native codes by adding a loading routine; and
    combining the self-modified native codes with the obfuscated general codes.

7. The method of claim 6, further comprising transmitting the self-modified native codes and the obfuscated general codes, which are combined by the code combiner, to a client.

8. The method of claim 7, wherein the self-modified native codes operate in a CPU environment and the obfuscated general codes are executed in a dalvik virtual machine.

9. The method of claim 8, wherein the separating of the execution codes by analyzing the execution codes determines the codes matched with the inputted execution codes as the sensitive codes, using stored sensitive code models.

10. The method of claim 9, wherein the loading routine decodes the encrypted section of the native code when the encrypted native code is executed.

* * * * *